United States Patent
Qu

(10) Patent No.: US 11,997,516 B2
(45) Date of Patent: May 28, 2024

(54) HARQ FEEDBACK METHOD AND DEVICE FOR MULTICAST COMMUNICATION, STORAGE MEDIUM, AND TERMINAL

(71) Applicant: BEIJING UNISOC COMMUNICATIONS TECHNOLOGY CO., LTD., Beijing (CN)

(72) Inventor: Xin Qu, Shanghai (CN)

(73) Assignee: BEIJING UNISOC COMMUNICATIONS TECHNOLOGY CO., LTD., Beijing (CN)

(*) Notice: Subject to any disclaimer, the term of this patent is extended or adjusted under 35 U.S.C. 154(b) by 388 days.

(21) Appl. No.: 17/422,338

(22) PCT Filed: Jan. 8, 2020

(86) PCT No.: PCT/CN2020/070882
§ 371 (c)(1),
(2) Date: Jul. 12, 2021

(87) PCT Pub. No.: WO2020/143661
PCT Pub. Date: Jul. 16, 2020

(65) Prior Publication Data
US 2022/0078647 A1   Mar. 10, 2022

(30) Foreign Application Priority Data

Jan. 11, 2019   (CN) .......................... 201910028446.8

(51) Int. Cl.
*H04W 72/0446* (2023.01)
*H04L 1/1812* (2023.01)
(Continued)

(52) U.S. Cl.
CPC .......... *H04W 24/08* (2013.01); *H04L 1/1812* (2013.01); *H04L 5/0053* (2013.01);
(Continued)

(58) Field of Classification Search
CPC ..... H04L 1/1812; H04L 47/50; H04L 12/863; H04L 5/0053; H04L 5/0055;
(Continued)

(56) References Cited

U.S. PATENT DOCUMENTS

2017/0347394 A1   11/2017   Yasukawa et al.
2018/0019844 A1   1/2018   Nogami et al.
(Continued)

FOREIGN PATENT DOCUMENTS

CN   107079437 A   8/2017
CN   108347313 A   7/2018
(Continued)

OTHER PUBLICATIONS

International Search Report for International Application No. PCT/CN2020/070882; dated Apr. 3, 2020.
(Continued)

*Primary Examiner* — Nathan S Taylor
(74) *Attorney, Agent, or Firm* — CANTOR COLBURN LLP

(57) ABSTRACT

An HARQ feedback method and device for multicast communication, a storage medium, and a terminal. The method comprises: in response to a failure to decode a sidelink control information, listening to HARQ feedback informations of other UEs in a group; determining, according to the HARQ feedback informations of the other UEs in the group, whether or not a HARQ-NACK feedback information or a data request information needs to be sent; and if so, sending the HARQ-NACK feedback information or the data request information over a preset resource. The solution provided by
(Continued)

the present invention can effectively improve communication reliability.

20 Claims, 5 Drawing Sheets

(51) Int. Cl.
*H04L 5/00* (2006.01)
*H04W 24/08* (2009.01)
*H04W 72/0453* (2023.01)
*H04W 72/20* (2023.01)

(52) U.S. Cl.
CPC ... *H04W 72/0446* (2013.01); *H04W 72/0453* (2013.01); *H04W 72/20* (2023.01)

(58) Field of Classification Search
CPC . H04L 1/1861; H04L 1/1864; H04L 12/1863; H04L 2001/0093; H04L 1/1607; H04L 12/18; H04L 1/16; H04L 1/18; H04L 5/00; H04W 52/365; H04W 72/12; H04W 28/0252; H04W 28/0263; H04W 28/0278; H04W 72/0413; H04W 72/1221; H04W 72/1263; H04W 76/15; H04W 88/00; H04W 88/085; H04W 72/04; H04W 76/00; H04W 24/08; H04W 72/0446; H04W 72/0453; H04W 72/20
See application file for complete search history.

(56) References Cited

U.S. PATENT DOCUMENTS

| | | | |
|---|---|---|---|
| 2019/0349895 A1 | 11/2019 | Liu et al. | |
| 2020/0092692 A1 | 3/2020 | Wang et al. | |
| 2020/0106566 A1* | 4/2020 | Yeo | H04W 28/04 |
| 2020/0112400 A1* | 4/2020 | Lee | H04L 5/0055 |
| 2020/0295810 A1* | 9/2020 | Baldemair | H04L 1/1822 |
| 2020/0295883 A1* | 9/2020 | Lee | H04L 5/0057 |
| 2021/0029761 A1* | 1/2021 | Jung | H04W 72/02 |
| 2021/0219268 A1* | 7/2021 | Li | H04W 72/20 |
| 2021/0288778 A1* | 9/2021 | Park | H04L 1/1812 |
| 2021/0306824 A1* | 9/2021 | Li | H04W 4/40 |
| 2021/0314796 A1* | 10/2021 | Hoang | H04W 52/36 |
| 2021/0321380 A1* | 10/2021 | Zhao | H04L 5/0055 |
| 2021/0344454 A1* | 11/2021 | Lee | H04L 1/1692 |
| 2021/0345313 A1* | 11/2021 | Basu Mallick | H04L 1/1825 |
| 2021/0410129 A1* | 12/2021 | Freda | H04W 72/543 |
| 2022/0006569 A1* | 1/2022 | Lee | H04W 72/02 |
| 2022/0085923 A1* | 3/2022 | Ye | H04L 1/1825 |
| 2022/0094481 A1* | 3/2022 | Hong | H04L 1/1812 |
| 2022/0140958 A1* | 5/2022 | Zhou | H04L 1/1861 370/329 |
| 2022/0225307 A1* | 7/2022 | Qu | H04W 72/044 |

FOREIGN PATENT DOCUMENTS

| | | | | |
|---|---|---|---|---|
| EP | 3843311 A1 * | 6/2021 | | H04L 1/1819 |
| WO | 2011080378 A1 | 7/2011 | | |
| WO | 2018171540 A1 | 9/2018 | | |

OTHER PUBLICATIONS

Kyocera, "Reliable Groupcast HARQ feedback scheme for NR V2X", R1-1900084, 3GPP TSG-RAN WG1-AH-1901, Taipei, TW, Jan. 21-25, 2019; 3 pages.
LG Electronics, "Discussion on physical layer procedure for NR V2X", R1-1900648, 3GPP TSG-RAN WG1-AH-1901, Taipei, TW, Jan. 21-25, 2019; 10 pages.
EPO Extended European Search report for corresponding to EP Application No. 20738244.1; dated Sep. 9, 2022.
Lenovo et al., "Physical layer procedures in NR V2X", 3GPP TSG RAN WG1 Meeting #95, R1-1812792, Nov. 12-16, 2018, 3 pages.
Seo, Hanbyul "Status Report to TSG", 3GPP TSG RAN Meeting #82, RP-182490, Dec. 10-13, 2018, 31 pages.
IPIN 1st Office Action for corresponding IN Application No. 202117034500; dated Mar. 4, 2022.

* cited by examiner

HARQ FEEDBACK METHOD AND DEVICE FOR MULTICAST COMMUNICATION, STORAGE MEDIUM, AND TERMINAL

CROSS REFERENCE TO RELATED APPLICATIONS

This is the U.S. national stage of application No. PCT/CN2020/070882, filed on Jan. 8, 2020. Priority under 35 U.S.C. § 119(a) and 35 U.S.C. § 365(b) is claimed from Chinese Application No. 201910028446.8, filed Jan. 11, 2019, the disclosure of which is also incorporated herein by reference.

TECHNICAL FIELD

The present disclosure generally relates to communication technology field, and more particularly, to a HARQ feedback method and device for multicast communication, a storage medium and a terminal.

BACKGROUND

With the development of the 3rd Generation Partnership Project (3GPP), New Radio (NR) vehicle to X (V2X) which is also known as vehicle to everything, has been studied as a key technology of Release 16 (R16). As an enhancement of Long Term Evolution (LTE) V2X technology, NR V2X is a key technology to enable the Internet of Vehicles.

In order to meet various needs of the Internet of Vehicles, NR V2X can support data transmission in three different ways: unicast, multicast and broadcast. Specifically, the multicast data transmission means that a Sidelink Control Information (SCI) and a scheduled sidelink data are sent by a User Equipment (UE) to multiple other UEs in a group, where the SCI is scrambled with an identification (ID). When anyone of the multiple other UEs in the group decodes and confirms that the scrambled ID of the SCI is a group ID of the group, it is determined as a destination receiver, and then decodes the scheduled sidelink data according to the SCI.

In order to improve the reliability of multicast communication, 3GPP has reached an agreement to introduce a feedback mechanism in multicast communication, such as Hybrid Automatic Repeat reQuest (HARQ). However, according to the existing feedback mechanism, when multiple UEs in a group use a same feedback resource to send feedback informations, a UE which receives the feedback informations, according to the received feedback informations, cannot distinguish a situation that some UEs are Discontinuous Transmission (DTX, in NR V2X, which means that SCI decoding fails and data reception failure occurs) and some UEs receives data successfully (by sending an ACKnowledgement (ACK) frame to indicate), from another situation that all UEs are ACK, therefore, whether data retransmission is needed cannot be determined effectively, resulting in poor reliability of data transmission.

SUMMARY

Embodiments of the present disclosure may further improve communication reliability.

In an embodiment of the present disclosure, a HARQ feedback method for multicast communication is provided, including: in response to a failure to decode a sidelink control information (SCI), monitoring Hybrid Automatic Repeat reQuest (HARQ) feedback informations of other UEs in a group; determining, according to the HARQ feedback informations of the other UEs in the group, whether or not a HARQ-Negative ACKnowledgment (HARQ-NACK) feedback information or a data request information needs to be sent; and if so, sending the HARQ-NACK feedback information or the data request information on a preset resource.

Optionally, monitoring HARQ feedback informations of other UEs in a group includes: monitoring at candidate positions of a sidelink multicast communication feedback channel; and when a monitored HARQ feedback information is scrambled with a preset group ID, determining that the monitored HARQ feedback information is a HARQ feedback information of the other UEs in the group.

Optionally, the candidate positions of the sidelink multicast communication feedback channel includes: candidate positions of the sidelink multicast communication feedback channel of HARQ feedback informations corresponding to all moments when no data or feedback information is sent.

Optionally, the HARQ feedback informations include a HARQ-ACK feedback information and a HARQ-NACK feedback information, wherein the HARQ-ACK feedback information is sent through a preset dedicated resource for a first feedback information, the HARQ-NACK feedback information is sent through a preset dedicated resource for a second feedback information, and the preset dedicated resource for the first feedback information and the preset dedicated resource for the second feedback information have a time offset in the time domain.

Optionally, determining, according to the HARQ feedback informations of the other UEs in the group, whether or not a HARQ-NACK feedback information or a data request information needs to be sent includes: when the other UEs in the group are monitored to send the HARQ-ACK feedback information, determining that the HARQ-NACK feedback information needs to be sent.

Optionally, sending the HARQ-NACK feedback information or the data request information on a preset resource includes: sending the HARQ-NACK feedback information on the preset dedicated resource for the second feedback information.

Optionally, the preset dedicated resource for the first feedback information and the preset dedicated resource for the second feedback information have a one-to-one mapping relationship which is configured or pre-configured by a higher layer, and sending the HARQ-NACK feedback information on the preset dedicated resource for the second feedback information includes: according to a time-frequency domain position of the monitored HARQ-ACK feedback information of the other UEs in the group and according to the one-to-one mapping relationship between the preset dedicated resource for the first feedback information and the preset dedicated resource for the second feedback information, determine a time-frequency domain position of the preset dedicated resource for the second feedback information; and sending the HARQ-NACK feedback information at the time-frequency domain position of the preset dedicated resource for the second feedback information.

Optionally, the HARQ feedback informations include a HARQ-ACK feedback information and a HARQ-NACK feedback information, wherein the HARQ-ACK feedback information is sent through a preset dedicated resource for a first feedback information, the HARQ-NACK feedback information is sent through a preset dedicated resource for a second feedback information, and the preset dedicated resource for the first feedback information and the preset dedicated resource for the second feedback information are the same in a time domain and different in a frequency domain.

Optionally, determining, according to the HARQ feedback informations of the other UEs in the group, whether or not a HARQ-NACK feedback information or a data request information needs to be sent includes: when the HARQ-ACK feedback information of the other UEs in the group is monitored on the preset dedicated resource for the first feedback information, determining whether the HARQ-NACK feedback information of the other UEs in the group is monitored on the preset dedicated resource for the second feedback information; and when the HARQ-ACK feedback information of the other UEs in the group is monitored on the preset dedicated resource for the first feedback information and the HARQ-NACK feedback information of the other UEs in the group is not monitored on the preset dedicated resource for the second feedback information, determining that the data request information needs to be sent.

Optionally, sending the HARQ-NACK feedback information or the data request information on a preset resource includes: sending the data request information on a preset dedicated resource for a third feedback information.

Optionally, the preset dedicated resource for the third feedback information and the preset dedicated resource for the first feedback information and/or the preset dedicated resource for the second feedback information have one-to-one mapping relationships which are configured or pre-configured by a higher layer, and sending the data request information on a preset dedicated resource for a third feedback information includes: according to a time-frequency domain position of the HARQ-ACK feedback information of the other UEs in the group and the one-to-one mapping relationship between the preset dedicated resource for the first feedback information and the preset dedicated resource for the third feedback information, and/or according to a time-frequency domain position of the HARQ-NACK feedback information of the other UEs in the group and according to the one-to-one mapping relationship between the preset dedicated resource for the second feedback information and the preset dedicated resource for the third feedback information, determining a time-frequency domain position of the preset dedicated resource for the third feedback information; and sending the data request information at the time-frequency domain position of the preset dedicated resource for the third feedback information.

Optionally, the preset dedicated resource for the third feedback information is shared by multiple UEs in the group.

Optionally, sending the HARQ-NACK feedback information or the data request information on a preset resource includes: acquiring the preset resource through resource awareness; and sending the data request information on the preset resource which is acquired.

Optionally, the data request information includes: an ID of a UE sending the data request information; and a time difference between the preset resource and a resource of the monitored HARQ-ACK feedback information of the other UEs in the group.

Optionally, the preset resource is dedicated to the UE.

Optionally, the time-frequency domain position of the preset dedicated resource for the first feedback information is indicated through a SCI, or determined by a combination of a high level signaling configuration and a SCI, or determined by a combination of pre-configuration and a SCI, or determined according to an association relationship with a receiving time-frequency domain position for a SCI or a sidelink data, where the association relationship is configured or pre-configured by a high-level signaling.

In an embodiment of the present disclosure, a HARQ feedback device for multicast communication is provided, including: a monitoring module, adapted to, in response to a failure to decode a SCI, monitor HARQ feedback informations of other UEs in a group; a determining module, adapted to determine, according to the HARQ feedback informations of the other UEs in the group, whether or not a HARQ-NACK feedback information or a data request information needs to be sent; and an information sending module, adapted to, when it is determined that the HARQ-NACK feedback information or the data request information needs to be sent, send the HARQ-NACK feedback information or the data request information on a preset resource.

In an embodiment of the present disclosure, a storage medium having computer instructions stored therein is provided, wherein once the computer instructions are executed, the above method is performed.

In an embodiment of the present disclosure, a terminal including a memory and a processor is provided, wherein the memory has computer instructions stored therein, and when the processor executes the computer instructions, the above method is performed.

Embodiments of the present disclosure may provide following advantages.

In embodiments of the present disclosure, a HARQ feedback method for multicast communication is provided, including: in response to a failure to decode a SCI, monitoring HARQ feedback informations of other UEs in a group; determining, according to the HARQ feedback informations of the other UEs in the group, whether or not a HARQ-NACK feedback information or a data request information needs to be sent; and if so, sending the HARQ-NACK feedback information or the data request information on a preset resource. According to the embodiments, communication reliability can be effectively improved. Specifically, a receiving UE monitors HARQ feedback informations sent by the other UEs in the group, and sends a HARQ feedback information or a data request information according to the monitoring result, so that a sending UE can accurately identify which UEs in the group has DTX, and data retransmission can be started in time, thereby improving the communication reliability in the multicast communication.

Further, the HARQ feedback information may include a HARQ-ACK feedback information and a HARQ-NACK feedback information. The HARQ-ACK feedback information may be sent through a preset dedicated resource for a first feedback information, and the HARQ-NACK feedback information may be sent through a preset dedicated resource for a second feedback information, where the preset dedicated resource for the first feedback information and the preset dedicated resource for the second feedback information may have a time offset in the time domain.

Specifically, the preset dedicated resource for the first feedback information and the preset dedicated resource for the second feedback information have a one-to-one mapping relationship which is configured or pre-configured by a higher layer. If a UE fails to decode the SCI, the preset dedicated resource for the second feedback information can still be determined according to the time-frequency domain position used by the HARQ-ACK feedback informations of the other UEs, and then a HARQ feedback can be sent through the preset dedicated resource for the second feedback information.

DETAILED DESCRIPTION

Figure 1:
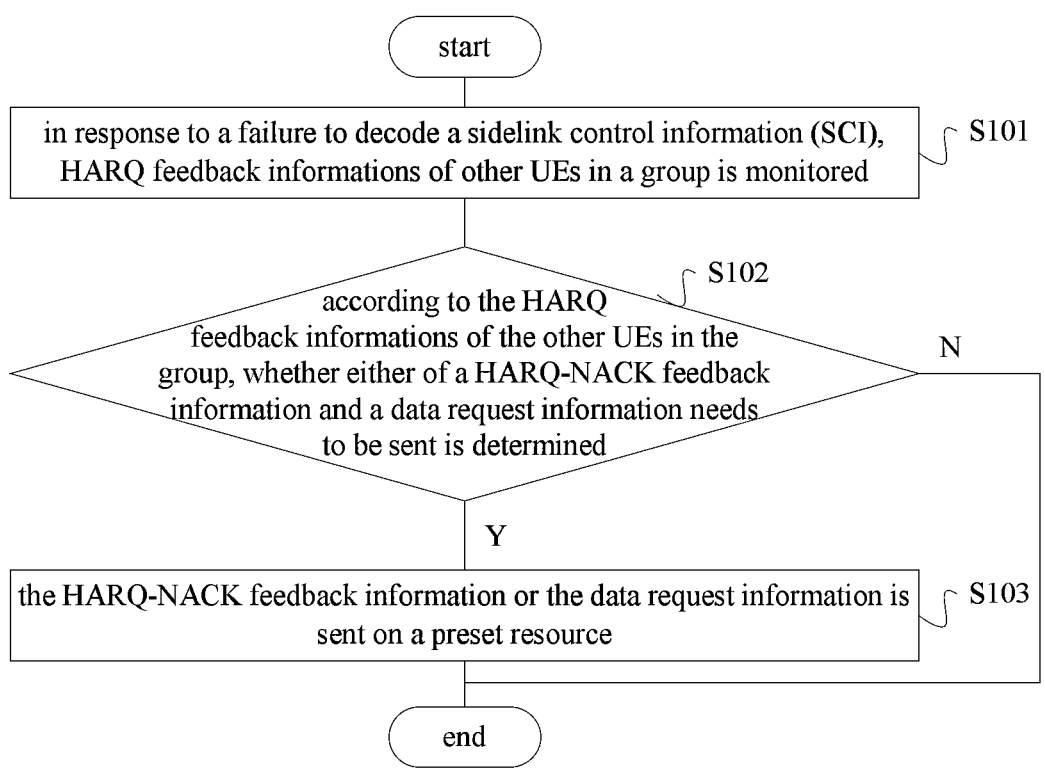
FIG. 1 schematically illustrates a flow chart of a HARQ feedback method for multicast communication according to an embodiment.

As described in background, according to the HARQ feedback mechanism in the existing multicast communication, when some UEs in a group send ACKs and some UEs send DTXs, a UE which receives feedback informations, according to the feedback informations, can only determine that all the UEs in the group have successfully decoded data and cannot recognize that DTX has occurred in some UEs, so that data retransmission will not be performed and the UEs which are DTXs fail to receive data correctly, which seriously affects the communication reliability within the group.

Specifically, there are two HARQ feedback mechanisms that may be used for multicast communication: first, not only Negative ACKnowledgment (NACK) is sent to indicate decoding failure (or data reception failure), but also ACKnowledgement (ACK) is sent to indicate successful decoding (or successful data reception), and multiple UEs which receive same data give feedback informations according to their own decoding results on their own assigned feedback resources; second, only NACK is sent as feedback information, in other words, when a UE does not decode data correctly, NACK is sent, and when the UE decodes data correctly, no feedback information is sent.

Furthermore, as for multicast communication, because destination receivers of data includes multiple UEs in a group, if each of the multiple UEs sends a NACK separately, feedback resources need to be configured for each of the multiple UEs, which may result in low resource utilization.

Therefore, that multiple UEs use a same feedback resource for sending feedback informations is proposed in the prior art, in which NACKs are sent in a superimposed manner. However, for the aforementioned NACK-only mechanism, when a sending UE does not receive any NACK feedback after sending data, the sending UE cannot tell whether all receiving UEs in the group have decoded the data correctly (i.e. ACK) or None of the receiving UEs in the group has decoded SCI successfully, so that the receiving UEs in the group cannot acquire the data sent by the sending UE (i.e. DTX).

Therefore, an enhanced solution is proposed in the prior art, in which two feedback resources are allocated for each data transmission and the two feedback resources are used to sent ACK and NACK informations, respectively. Specifically, receiving UEs which have successfully decoded data send ACK informations on the feedback resource configured for sending ACK informations in a superimposed manner, and receiving UEs which have failed to decode data send NACK informations on the feedback resource configured for sending NACK informations in a superimposed manner.

Therefore, when the sending UE does not monitor any feedback information on the feedback resource configured for sending ACK informations and the feedback resource configured for sending NACK informations, it is determined that most of the receiving UEs in the group are DTXs and the data needs to be retransmitted.

In this way, the sending UE can effectively distinguish the situation that most or all receiving UEs the group are ACKs from the situation that most or all receiving UEs in the group are DTXs. However, when some receiving UEs in the group are ACKs and some receiving UEs are DTXs, the sending UE receiving the feedback informations can only determine that all the receiving UEs in the group have successfully decoded the data, and cannot identify the receiving UEs which are DTXs. As a result, the receiving UEs which are DTXs cannot receive data correctly.

Inventors of the present disclosure found that the main reason is the existing HARQ feedback mechanism in NR V2X is evolved on the basis of the one-to-one HARQ feedback mechanism of Long Term Evolution (LTE), in which there is no multicast communication and data transmission and feedback are one-to-one. For example, if a UE1 sends data to a UE2, the UE2 sends ACK as a feedback to the UE1 if the UE2 has decoded data successfully, and the UE2 sends NACK as a feedback to the UE1 if the UE2 has failed to decode data. If UE1 receives neither ACK nor NACK, it is determined that the UE2 has failed to decode data and data retransmission is required.

However, in the multicast communication of NR V2X, data transmission is performed in the form of one-to-many. In order to save resources, the feedback informations of all receiving UEs in the group are superimposed for feedback. When some UEs in the group are ACKs and some UEs are DTXs, only the UEs which are ACK will feed back ACKs. As for the sending UE (named as UE1), the UE1 only receives ACKs, and it is difficult to determine a number of the ACKs received from a feedback resource in the prior art. Therefore, the UE1 cannot identify how many UEs have fed back ACKs in the group. In this case, since NACKs are not received (because the UEs which are DTXs have failed to decode the SCI and cannot obtain a time-frequency domain position of a feedback resource for sending the NACKs), the UE1 may determine that all UEs in the group are ACKs, which is obviously inconsistent with the actual situation.

In embodiments of the present disclosure, DTX means: a sending UE sends a SCI and a sidelink data, while a receiving UE fails to decode the SCI, resulting in neither sending ACK on a feedback resource configured for feeding back ACK nor sending NACK on a feedback resource configured for feeding back NACK; this kind of situation in NR V2X is called as DTX.

In order to solve the problems described above, a HARQ feedback method for multicast communication is provided in embodiments of the present disclosure, including: in response to a failure to decode a sidelink control information (SCI), monitoring HARQ feedback informations of other UEs in a group; determining, according to the HARQ feedback informations of the other UEs in the group, whether or not a HARQ-NACK feedback information or a data request information needs to be sent; and if so, sending the HARQ-NACK feedback information or the data request information on a preset resource.

According to the embodiments, communication reliability can be effectively improved. Specifically, a receiving UE monitors HARQ feedback informations sent by the other UEs in the group, and sends a HARQ feedback information or a data request information according to the monitoring result, so that a sending UE can accurately identify which UEs in the group has DTX, and data retransmission can be started in time, thereby improving the communication reliability in the multicast communication.

In order to clarify the object, characteristic and advantages of embodiments of the present disclosure, embodiments of present disclosure will be described clearly in detail in conjunction with accompanying drawings.

FIG. 1 schematically illustrates a flow chart of a HARQ feedback method for multicast communication according to an embodiment. The method of the embodiment may be applied to an Internet of Vehicles, such as NR V2X. The method of the embodiment may be executed by a UE which works as a receiving end. For the convenience of description, a UE which works as a sending end is called as a sender for short in the following descriptions, and all UEs in the following descriptions refer to UEs which work as receiving ends.

Referring to FIG. 10, the HARQ feedback method for multicast communication includes S101 to S103.

In S101, in response to a failure to decode a sidelink control information (SCI), HARQ feedback informations of other UEs in a group is monitored.

In S102, according to the HARQ feedback informations of the other UEs in the group, whether or not a HARQ-NACK feedback information or a data request information needs to be sent is determined.

In S103, if so, the HARQ-NACK feedback information or the data request information is sent on a preset resource.

Otherwise, if it is determined that the HARQ-NACK feedback information or the data request information does not need to be sent, the UE does not perform any further operations until a failure to decode a SCI occurs again, and the UE will listen to HARQ feedback informations of other UEs in the group again.

Specifically, for the UE as the receiving end, when the decoding the SCI fails, since a feedback resource used for HARQ feedback is indicated by the SCI, the UE will not be able to obtain a time-frequency domain position of the feedback resource.

When the foregoing situation occurs, the UE executing the solution provided in the embodiment may acquire reception status of other UEs in the group by monitoring the HARQ feedback informations of the other UEs in the group. Monitoring results may include: Case 1, the HARQ feedback informations of the other UEs in the group include both HARQ-ACK feedback informations and HARQ-NACK feedback informations; Case 2, all of the HARQ feedback informations of the other UEs in the group are HARQ-ACK feedback informations.

Further, the UE executing the solution provided in the embodiment may determine its own HARQ feedback mechanism according to the monitoring results of the HARQ feedback informations of the other UEs in the group, which includes whether a HARQ feedback is required, a specific timing of the HARQ feedback, and a specific information of the HARQ feedback.

In Case 1, since some UEs in the group have already fed back NACKs, it can be determined that the sender will retransmit data, so that the UE executing the solution provided in the embodiment may choose not to perform HARQ feedback, so as to reduce signaling overhead and save resources.

In Case 2, since no UE in the group feeds back NACK for the time being, in order to prevent the sender from determining that all UEs in the group are ACKs, the UE executing the solution provided in the embodiment may choose to perform S103 in which the HARQ feedback is performed.

Therefore, the UE monitors the HARQ feedback informations sent by the other UEs in the group, and sends the HARQ-NACK feedback information or the data request information according to the monitoring results, so that the sender can accurately identify that some UEs in the group have DTX and can start a subsequent data retransmission promptly, thereby improving the data transmission reliability of multicast communication.

In some embodiments, since the UE failed to decode the SCI, the UE cannot obtain the time-frequency domain position of the feedback resource for HARQ feedback indicated by the sender. Therefore, the UE needs to monitor at candidate positions of a sidelink multicast communication feedback channel. Specifically, S101 may include: monitoring at the candidate positions of the sidelink multicast communication feedback channel; when a monitored HARQ feedback information is scrambled with a preset group ID, determining that the monitored HARQ feedback information is a HARQ feedback information of the other UEs in the group.

In some embodiments, the candidate positions of the sidelink multicast communication feedback channel may include: candidate positions of the sidelink multicast communication feedback channel of HARQ feedback informations corresponding to all moments when no data or feedback information is sent.

Further, when the UE monitors a HARQ feedback information scrambled with the group ID of the group at candidate positions of a sidelink feedback channel, the SCI of the multicast data corresponding to the HARQ feedback information which has not been decoded successfully may be determined. Further, according to the monitored HARQ feedback information, the UE may perform different solutions. Hereinafter, detailed implementation of S102 and S103 performed by the UE will be described in detail.

Further, in different solutions, the UE may send the HARQ-NACK feedback information or the data request information on different preset resources. Specifically, the different preset resources may include: a preset dedicated resource for a second feedback information, a preset dedicated resource for a third feedback information, and a resource acquired through resource awareness.

In some embodiments, the HARQ feedback information may include a HARQ-ACK feedback information and a HARQ-NACK feedback information, where the HARQ-ACK feedback information may be sent through a preset dedicated resource for a first feedback information, and the HARQ-NACK feedback information may be sent through the preset dedicated resource for the second feedback information. Specifically, the preset dedicated resource for the first feedback information and the preset dedicated resource for the second feedback information may have a one-to-one mapping relationship which may be configured or pre-configured by a higher layer. The preset dedicated resource for the first feedback information may be indicated by the sender through the SCI, and the UEs in the group may obtain the preset dedicated resource for the first feedback information by decoding the SCI, and may obtain the preset dedicated resource for the second feedback information by calculating according to the one-to-one mapping relationship between the preset dedicated resource for the first feedback information and the preset dedicated resource for the second feedback information.

In an embodiment, a time-frequency domain position of the preset dedicated resource for the first feedback information may be indicated through a SCI. For example, the time-frequency domain position of the preset dedicated resource for the first feedback information may be indicated through the SCI, and a UE in the group which successfully decodes the SCI may determine a time-frequency domain position of the preset dedicated resource for the second feedback information according to the time-frequency domain position of the preset dedicated resource for the first feedback information and the one-to-one mapping relationship configured or pre-configured by the higher layer.

In another embodiment, the time-frequency domain position of the preset dedicated resource for the first feedback information may be determined by a combination of a high level signaling configuration and a SCI. For example, a set of feedback resources may be configured for a UE in advance through the high level signaling configuration, and a feedback resource that the UE may use currently may be indicated through the SCI. Optionally, the high level signaling configuration may be configured through a Radio Resource Control (RRC) signaling.

In another embodiment, the high level signaling configuration may be replaced with a pre-configuration. For example, in some NR V2X scenarios, UEs may perform data communication without a base station. In this case, the set of feedback resources may be set in the UE's code through the pre-configuration, and the feedback resource that the UE may use currently may be indicated through the SCI.

In another embodiment, the time-frequency domain position of the preset dedicated resource for the first feedback information may be determined according to an association relationship with a receiving time-frequency domain position for a SCI or a sidelink data, where the association relationship may be determined through a high-level signaling configuration or a pre-configuration. The receiving time-frequency domain position refers to a time-frequency domain position on which the SCI or the sidelink data is received.

For example, the resource used for sending the SCI and the preset dedicated resource for the first feedback information may have a one-to-one mapping relationship. And in response to receiving the SCI, the UE may calculate to obtain the time-frequency domain position of the preset dedicated resource for the first feedback information according to a time-frequency domain position on which the SCI is received and the one-to-one mapping relationship.

Similarly, the resources used for sending the sidelink data and the preset dedicated resource for the first feedback information may have a one-to-one mapping relationship. And in response to receiving the sidelink data, the UE may calculate to obtain the time-frequency domain position of the preset dedicated resource for the first feedback information according to a time-frequency domain position on which the sidelink data is received and the one-to-one mapping relationship.

In the prior art, UEs which fail to decode cannot obtain the preset dedicated resource for the first feedback information and the preset dedicated resource for the second feedback information, and thus cannot perform ACK or NACK feedback. However, the UE in the embodiments of the present disclosure can obtain the time-frequency domain position of the preset dedicated resource for the first feedback information by monitoring, the feedback informations of other UEs in the group, and then calculate to obtain the preset dedicated resource for the second feedback information according to one-to-one mapping relationship between the preset dedicated resource for the first feedback information and the preset dedicated resource for the second feedback information.

In an embodiment, the preset dedicated resource for the first feedback information and the preset dedicated resource for the second feedback information may have a time offset in the time domain. For example, referring to FIG. 2, in the time domain a preset dedicated resource for the first feedback information 21 and a preset dedicated resource for the second feedback information 22 have a time gap. Further, in the frequency domain, the preset dedicated resource for the first feedback information 21 and the preset dedicated resource for the second feedback information 22 may not overlap, overlap partially, or overlap completely.

Figure 2:
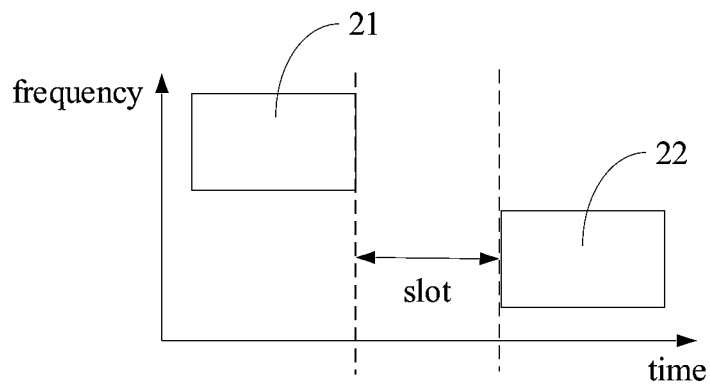
FIG. 2 schematically illustrates a distribution of preset resources according to an embodiment.
Figure 3:
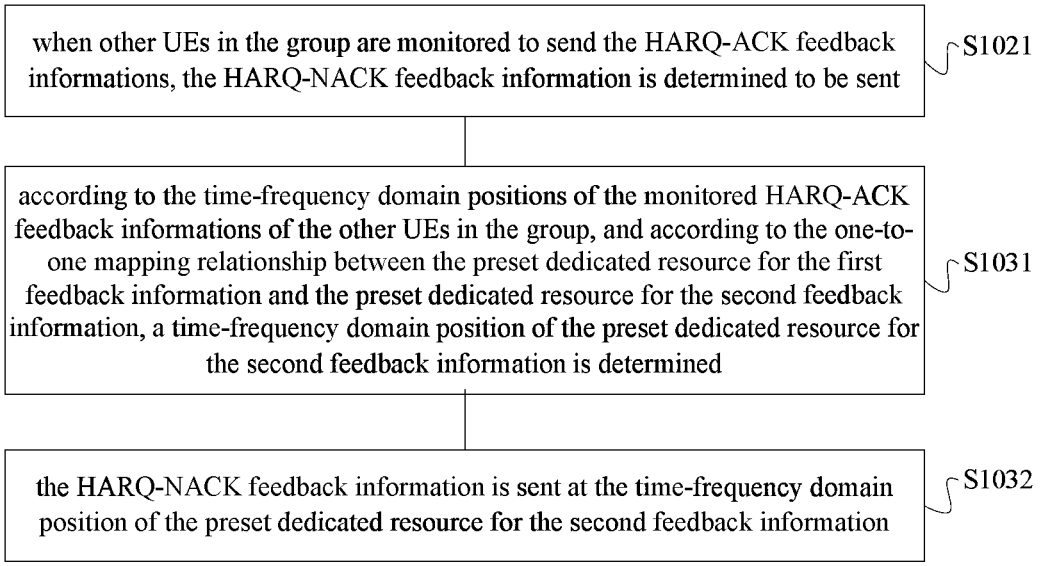
FIG. 3 schematically illustrates a flow chart of S102 and S103 as shown in FIG. 1 according to an embodiment.

Further, referring to FIG. 2 and FIG. 3, S102 may include S1021: when other UEs in the group are monitored to send the HARQ-ACK feedback informations, the HARQ-NACK feedback information is determined to be sent.

Further, S103 may include: sending the HARQ-NACK feedback information on the preset dedicated resource for the second feedback information.

In some embodiments, the UE may perform S1031: according to the time-frequency domain positions of the monitored HARQ-ACK feedback informations of the other UEs in the group, and according to the one-to-one mapping relationship between the preset dedicated resource for the first feedback information and the preset dedicated resource for the second feedback information, determining a time-frequency domain position of the preset dedicated resource for the second feedback information. Further, the UE may perform S1032: sending the HARQ-NACK feedback information at the time-frequency domain position of the preset dedicated resource for the second feedback information.

In summary, By spacing the preset dedicated resource for the first feedback information and the preset dedicated resource for the second feedback information in the time domain, when the other UEs in the group are monitored to send the HARQ-ACK feedback informations, the UE executing the solution provided in the embodiments can be determined to be DTX, and then the HARQ-NACK feedback information can be determined to be sent on the preset dedicated resource for the second feedback information, so that the sender can accurately learn the decoding failure of the UE and start a retransmission.

In a typical application scenario of multicast communication, referring to FIG. 1 to FIG. 3, the preset dedicated resource for the first feedback information 21 and the preset dedicated resource for the second feedback information 22 have fixed time-frequency domain sizes and have a time offset in the time domain, and the time-frequency domain positions of the preset dedicated resource for the first feedback information 21 and the preset dedicated resource for the second feedback information 22 have a one-to-one mapping relationship.

In some embodiments, the sender of the multicast communication indicates the time-frequency domain position of the preset dedicated resource for the first feedback information 21 in a SCI, and the UEs in the group decode the SCI and then determines the time-frequency domain position of the preset dedicated resource for the second feedback information dedicated resource 22 according to the time-frequency domain position of the preset dedicated resource 21 and the one-to-one mapping relationship between the preset dedicated resource for the first feedback information 21 and the preset dedicated resource for the second feedback information 22. The preset dedicated resource for the first feedback information 21 and the preset dedicated resource for the second feedback information 22 may be configured by the network or pre-configured by the base station.

For UEs in the group which have successfully decoded sidelink data scheduled by a sidelink control channel, the HARQ-ACK feedback informations may be superposed on the preset dedicated resource for the first feedback information 21 to be sent, so that the HARQ-ACK feedback informations may be carried by 1 bit, where a value of the bit is 1; in addition, the HARQ-ACK feedback informations may be scrambled by the group ID. In other words, the multiple UEs in the group which have successfully decoded the sidelink data scheduled by the sidelink control channel send the HARQ-ACK feedback informations on a same time-frequency resource.

Because UEs which have failed to decode the SCI cannot obtain the sidelink data scheduled by the SCI, no HARQ feedback information is sent on the preset dedicated resource for the first feedback information 21 indicated by the SCI. The UE may monitor at candidate positions of the sidelink multicast communication feedback channel of the HARQ feedback information corresponding to all moments when no data or feedback information is sent. And when the HARQ-ACK feedback information scrambled with the group ID is monitored, the UE may be determined to have failed decoded the SCI of the sidelink data corresponding to the HARQ-ACK feedback information, and the corresponding UE is DTX.

Further, the UE may determine the time-frequency domain position of the preset dedicated resource for the second feedback information 22 according to a time-frequency domain position at which the HARQ-ACK feedback information is monitored, and then send the HARQ-NACK feedback information on the preset dedicated resource for the second feedback information 22.

In some embodiments, for a UE in the group that has successfully decoded the sidelink control channel but failed to decode the sidelink data scheduled by the sidelink control channel, the UE may also send the HARQ-NACK feedback information on the preset dedicated resource for the second feedback information 22. Multiple UEs may send the HARQ-NACK feedback information on a same time-frequency resource.

In another embodiment, the preset dedicated resource for the first feedback information and the preset dedicated resource for the second feedback information are the same in the time domain and different in the frequency domain. For example, referring to FIG. 4 and FIG. 6, the preset dedicated resource for the first feedback information 21 and the preset dedicated resource for the second feedback information 22 are the same in the time domain and do not overlap in the frequency domain.

Figure 4:
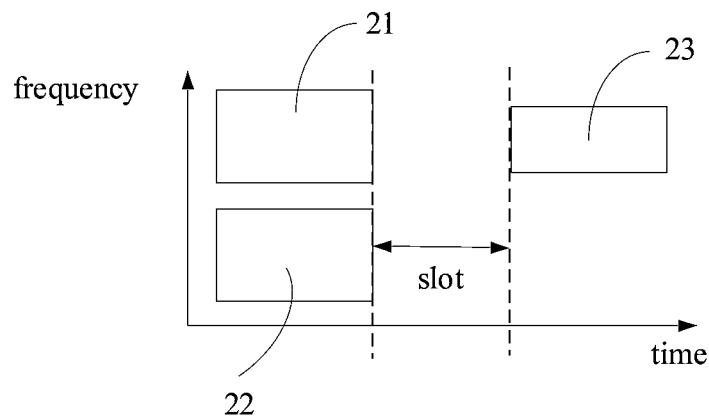
FIG. 4 schematically illustrates a distribution of preset resources according to another embodiment.
Figure 5:
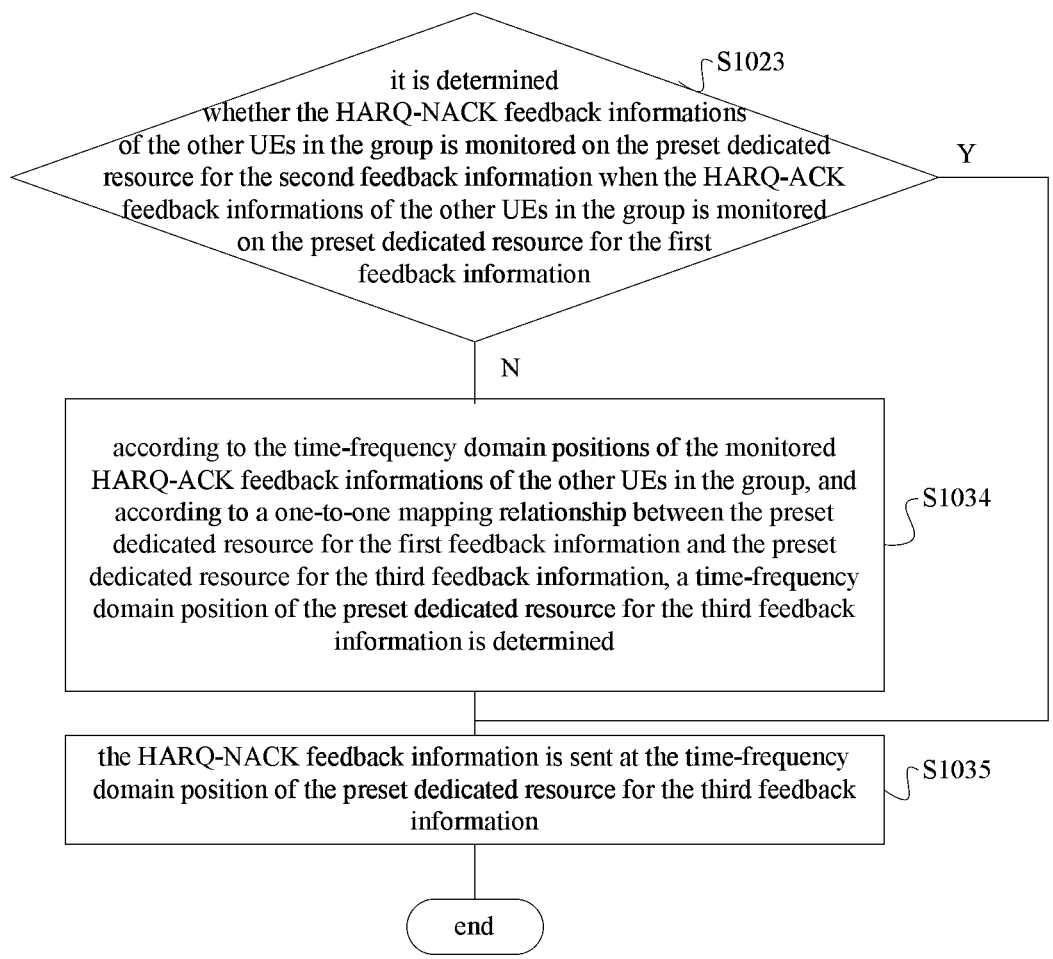
FIG. 5 schematically illustrates a flow chart of S102 and S103 as shown in FIG. 1 according to another embodiment.

Further, with reference to FIG. 4 and FIG. 5, S102 may include S1023: determining, when the HARQ-ACK feedback informations of the other UEs in the group is monitored on the preset dedicated resource for the first feedback information, whether the HARQ-NACK feedback informations of the other UEs in the group is monitored on the preset dedicated resource for the second feedback information; and if no, that is, when the result of S1023 indicates that, when the HARQ-ACK feedback informations of the other UEs in the group is monitored on the preset dedicated resource for the first feedback information, no HARQ-NACK feedback informations of the other UEs in the group is monitored on the preset dedicated resource for the second feedback information, determining that the data request information needs to be sent.

Further, S103 may include: sending the data request information on a preset dedicated resource for a third feedback information.

In some embodiments, the UE may perform S1034: according to the time-frequency domain positions of the monitored HARQ-ACK feedback informations of the other UEs in the group, and according to a one-to-one mapping relationship between the preset dedicated resource for the first feedback information and the preset dedicated resource for the third feedback information, determining a time-frequency domain position of the preset dedicated resource for the third feedback information. Further, the UE may perform S1035: sending the HARQ-NACK feedback information at the time-frequency domain position of the preset dedicated resource for the third feedback information.

Alternatively, S1034 may include: according to the time-frequency domain positions of the monitored HARQ-NACK feedback informations of the other UEs in the group, and according to a one-to-one mapping relationship between the preset dedicated resource for the second feedback information and the preset dedicated resource for the third feedback information, determining a time-frequency domain position of the preset dedicated resource for the third feedback information.

Alternatively, S1034 may include: according to the time-frequency domain positions of the monitored HARQ-ACK feedback informations of the other UEs in the group and the one-to-one mapping relationship between the preset dedicated resource for the first feedback information and the preset dedicated resource for the third feedback informations, and according to the time-frequency domain positions of the monitored HARQ-NACK feedback informations of the other UEs in the group, and according to the one-to-one mapping relationship between the preset dedicated resource for the second feedback information and the preset dedicated resource for the third feedback information, determining the time-frequency domain position of the preset dedicated resource for the third feedback information comprehensively.

Therefore, even if the UE fails to decode the SCI, the time-frequency domain position of the preset dedicated resource for the third feedback information may be determined according to the time-frequency domain position of the preset dedicated resource for the first feedback information or of the preset dedicated resource for the second feedback information.

In some embodiments, the preset dedicated resource for the third feedback information which is adapted to send the data request information may be pre-configured by the base station or the network, and the preset dedicated resource for the third feedback information may be shared by multiple UEs in the group. For example, in an embodiment, all UEs in the group which have DTX may send superimposed data request informations on the preset dedicated resource for the third feedback information.

In an embodiment, referring to FIG. 4, in the time domain, a preset dedicated resource for the third feedback information 23 may have time slots with the preset dedicated resource for the first feedback information 21 and the preset dedicated resource for the second feedback information 22. Further, in the frequency domain, the preset dedicated resource for the third feedback information 23 and the preset dedicated resource for the first feedback information 21 may not overlap at all, overlap partially, or overlap completely.

Similarly, in the frequency domain, the preset dedicated resource for the third feedback information 23 and the preset dedicated resource for the second feedback information 22 may not overlap at all, overlap partially, or overlap completely.

In another typical application scenario of multicast communication, referring to FIG. 1, FIG. 4, and FIG. 5, the preset dedicated resource for the first feedback information 21 and the preset dedicated resource for the second feedback information 22 are the same in the time domain, but different in the frequency domain.

In some embodiments, the sender of the multicast communication indicates the time-frequency domain position of the preset dedicated resource for the first feedback information 21 in a SCI, and the UEs in the group decode the SCI and then determines the time-frequency domain position of the preset dedicated resource for the second feedback information dedicated resource 22 according to the time-frequency domain position of the preset dedicated resource 21 and the one-to-one mapping relationship between the preset dedicated resource for the first feedback information 21 and the preset dedicated resource for the second feedback information 22. The preset dedicated resource for the first feedback information 21 and the preset dedicated resource for the second feedback information 22 may be configured by the network or pre-configured by the base station.

For UEs in the group which have successfully decoded sidelink data scheduled by a sidelink control channel, the HARQ-ACK feedback informations may be superposed on the preset dedicated resource for the first feedback information 21 to be sent, so that the HARQ-ACK feedback informations may be carried by 1 bit, where a value of the bit is 1; in addition, the HARQ-ACK feedback informations may be scrambled by the group ID. In other words, the multiple UEs in the group which have successfully decoded the sidelink data scheduled by the sidelink control channel send the HARQ-ACK feedback informations on a same time-frequency resource.

In some embodiments, for a UE in the group that has successfully decoded the sidelink control channel but failed to decode the sidelink data scheduled by the sidelink control channel, the UE may also send the HARQ-NACK feedback information on the preset dedicated resource for the second feedback information 22. Multiple UEs may send the HARQ-NACK feedback information on a same time-frequency resource.

Because UEs which have failed to decode the SCI cannot obtain the sidelink data scheduled by the SCI, no HARQ feedback information is sent on the preset dedicated resource for the first feedback information 21 and the preset dedicated resource for the second feedback information 22 indicated by the SCI. The UE may monitor at candidate positions of the sidelink multicast communication feedback channel of the HARQ feedback information corresponding to all moments when no data or feedback information is sent. And when the HARQ-ACK feedback information scrambled with the group ID is monitored, the UE may be determined to have failed decoded the SCI of the sidelink data corresponding to the HARQ-ACK feedback information, and the corresponding UE is DTX.

Further, when the UE only monitors the HARQ-ACK feedback information scrambled with the group ID of the group, the UE may determine the time-frequency domain position of the preset dedicated resource for the second feedback information 22 and the time-frequency domain position of the preset dedicated resource for the third feedback information 23 according to the time-frequency domain position of the monitored HARQ-ACK feedback information. And when the UE does not monitor the HARQ-NACK feedback information scrambled with the group ID of the group on the preset dedicated resource for the second feedback information 22, the UE may send the data request information on the preset dedicated resource for the third feedback information 23, where the data request information may be used to request the sender to retransmit the data scheduled by the SCI.

In some embodiments, for multiple UEs which have failed to decode a same SCI, the data request information may be superimposed and sent on the same preset dedicated resource for the third feedback information 23. Specifically, the data request information may be carried by a sequence or one bit.

In some embodiments, when the UE not only monitors the HARQ-ACK feedback information scrambled with the group ID of the group, but also monitors the HARQ-NACK feedback information scrambled with the group ID of the group on the preset dedicated resource for the second feedback information 22, the UE does not perform S103, that is, the UE does not send the data request information on the preset dedicated resource for the third feedback information 23.

Figure 6:
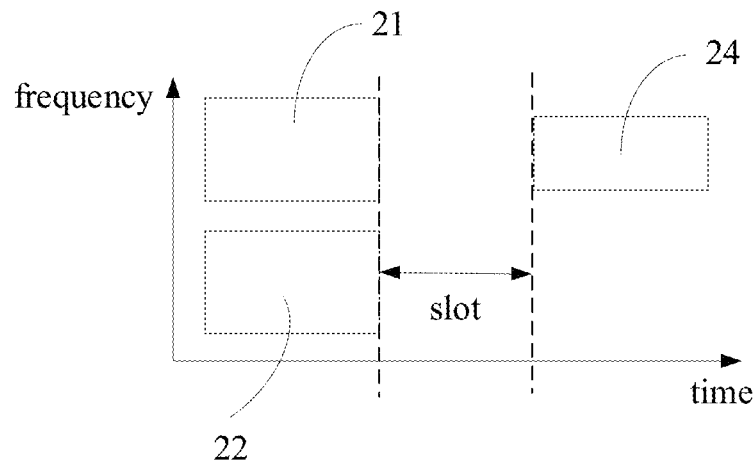
FIG. 6 schematically illustrates a distribution of preset resources according to another embodiment.

In another embodiment, preset resources may be obtained by the UE through resource sensing. Referring to FIG. 6, compared with the embodiments described in conjunction with FIG. 4 and FIG. 5, a resource 24 used to send the data request information is a resource dedicated to a UE, and a plurality of UEs which have DTXs in the group determine their own resources 24 through resource sensing and use the resources 24 to send their own resources, respectively. However, in the embodiments described in conjunction with FIG. 4 and FIG. 5, the preset dedicated resource for the third feedback information 23 used to send the data request information is shared by all UEs which have DTXs in the group, and all the UEs which have DTXs in the group superimpose their data request informations on the preset dedicated resource for the third feedback information 23.

Figure 7:
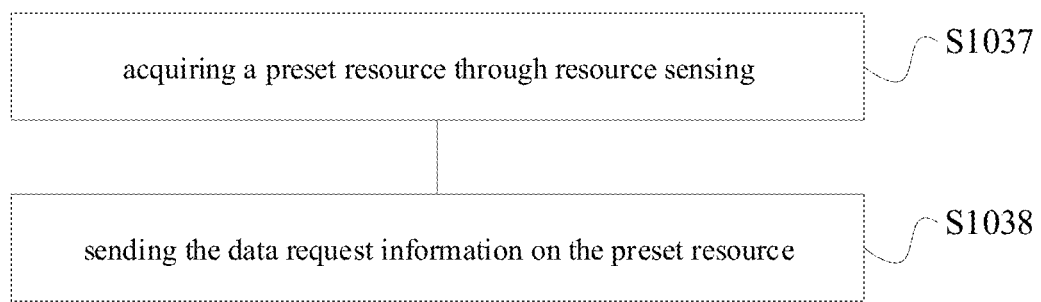
FIG. 7 schematically illustrates a flow chart of S102 and S103 as shown in FIG. 1 according to another embodiment.

In some embodiments, referring to FIG. 7, S103 may include: S1037, acquiring a preset resource through resource sensing; and S1038, sending the data request information on the preset resource.

Further, the data request information may include: an ID of the UE sending the data request information; and a time difference between the preset resource and the resource of the monitored HARQ-ACK feedback information of other UEs in the group (that is, the preset dedicated resource for the first feedback information).

In another typical application scenario of multicast communication, with reference to FIG. 1, FIG. 6 and FIG. 7, the preset dedicated resource for the first feedback information 21 and the preset dedicated resource for the second feedback information 22 are the same in the time domain, but different in the frequency domain.

In some embodiments, the sender of the multicast communication indicates the time-frequency domain position of the preset dedicated resource for the first feedback information 21 in a SCI, and the UEs in the group decode the SCI and then determines the time-frequency domain position of the preset dedicated resource for the second feedback information dedicated resource 22 according to the time-frequency domain position of the preset dedicated resource 21 and the one-to-one mapping relationship between the preset dedicated resource for the first feedback information 21 and the preset dedicated resource for the second feedback information 22. The preset dedicated resource for the first feedback information 21 and the preset dedicated resource for the second feedback information 22 may be configured by the network or pre-configured by the base station.

For UEs in the group which have successfully decoded sidelink data scheduled by a sidelink control channel, the HARQ-ACK feedback informations may be superposed on the preset dedicated resource for the first feedback information 21 to be sent, so that the HARQ-ACK feedback informations may be carried by 1 bit, where a value of the bit is 1; in addition, the HARQ-ACK feedback informations may be scrambled by the group ID. In other words, the multiple UEs in the group which have successfully decoded the sidelink data scheduled by the sidelink control channel send the HARQ-ACK feedback informations on a same time-frequency resource.

In some embodiments, for a UE in the group that has successfully decoded the sidelink control channel but failed to decode the sidelink data scheduled by the sidelink control channel, the UE may also send the HARQ-NACK feedback information on the preset dedicated resource for the second feedback information 22. Multiple UEs may send the HARQ-NACK feedback information on a same time-frequency resource.

Because UEs which have failed to decode e SCI cannot obtain the sidelink data scheduled by the SCI, no HARQ feedback information is sent on the preset dedicated resource for the first feedback information 21 and the preset dedicated resource for the second feedback information 22 indicated by the SCI. The UE may monitor at candidate positions of the sidelink multicast communication feedback channel of the HARQ feedback information corresponding to all moments when no data or feedback information is sent. And when the HARQ-ACK feedback information scrambled with the group ID is monitored, the UE may be determined to have failed decoded the SCI of the sidelink data corresponding to the HARQ-ACK feedback information, and the corresponding UE is DTX.

Further, when the UE only monitors the HARQ-ACK feedback information scrambled with the group ID of the group, the UE may determine the time-frequency domain position of the preset dedicated resource for the second feedback information 22 and the time-frequency domain position of the preset dedicated resource for the third feedback information 23 according to the time-frequency domain position of the monitored HARQ-ACK feedback information. And when the UE does not monitor the HARQ-NACK feedback information scrambled with the group ID of the group on the preset dedicated resource for the second feedback information 22, the UE may obtain the resource 24 for sending the data request information through resource sensing. The data request information may include the time difference between the resource 24 for sending the data request information and the feedback resource where the UE has monitored the HARQ-ACK feedback information (that is, the preset dedicated resource for the first feedback information). Further, the data request information may include the ID of the UE.

Further, the data request information may be scrambled with the group ID.

In some embodiments, for multiple UEs which have failed to decode a same SCI, the multiple UEs may select time-frequency domain resources to send their own data request informations, respectively.

For the sender, after receiving the data request information from another UE in the group, the sender may determine data information requested by the another UE according to the time difference included in the data request information and determine an identity of the UE through the ID, and then retransmit the data information for the another UE.

In some embodiments, when the UE not only monitors the HARQ-ACK feedback information scrambled with the group ID of the group, but also monitors the HARQ-NACK feedback information scrambled with the group ID of the group on the preset dedicated resource for the second feedback information 22, the UE does not perform S103, that is, the UE does not send the data request information on the preset dedicated resource for the third feedback information 23.

Figure 8:
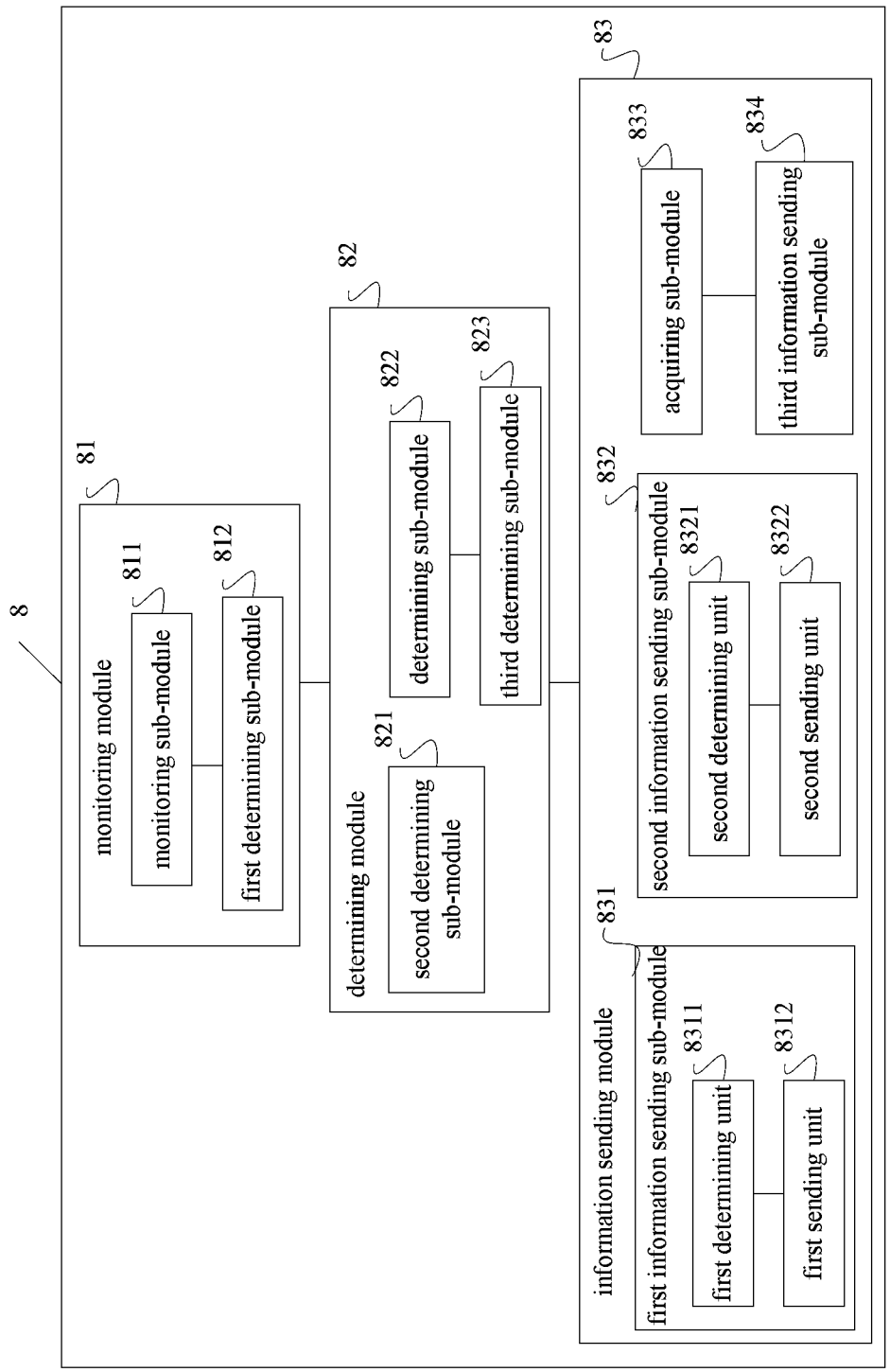
FIG. 8 schematically illustrates a structural diagram of a HARQ feedback device for multicast communication according to an embodiment.

FIG. 8 schematically illustrates a structural diagram of a HARQ feedback device for multicast communication according to an embodiment. Those skilled in the art can understand that the HARQ feedback device 8 for multicast communication (referred to as HARQ feedback device 8 for short) described in the embodiment may be used to execute the method as shown in FIG. 1 to FIG. 7.

In some embodiments, the HARQ feedback device 8 includes: a monitoring module 81, adapted to, in response to a failure to decode a sidelink control information (SCI), monitor Hybrid Automatic Repeat reQuest (HARQ) feedback informations of other UEs in a group; a determining module 82, adapted to determine, according to the HARQ feedback informations of the other UEs in the group, whether or not a HARQ-Negative ACKnowledgment (HARQ-NACK) feedback information or a data request information needs to be sent; and an information sending module 83, adapted to, when it is determined that the HARQ-NACK feedback information or the data request information needs to be sent, send the HARQ-NACK feedback information or the data request information on a preset resource.

In an embodiment, the monitoring module 81 may include: a monitoring sub-module 811, adapted to monitor at candidate positions of a sidelink multicast communication feedback channel; a first determining sub-module 812, adapted to, when a monitored HARQ feedback information is scrambled with a preset group ID, determine that the monitored HARQ feedback information is a HARQ feedback information of the other UEs in the group.

Further, the candidate positions of the sidelink multicast communication feedback channel may include: candidate positions of the sidelink multicast communication feedback channel of HARQ feedback informations corresponding to all moments when no data or feedback information is sent.

Further, the HARQ feedback information may include a HARQ-ACK feedback information and a HARQ-NACK feedback information. The HARQ-ACK feedback information may be sent through a preset dedicated resource for a first feedback information, and the HARQ-NACK feedback information may be sent through a preset dedicated resource for a second feedback information, where the preset dedicated resource for the first feedback information and the preset dedicated resource for the second feedback information may have a time offset in the time domain.

Further, the determining module 82 may include: a second determining sub-module 821, adapted to, when the other UEs in the group are monitored to send the HARQ-ACK feedback information, determine that the HARQ-NACK feedback information needs to be sent.

Further, the information sending module 83 may include: a first information sending sub-module 831, adapted to send the HARQ-NACK feedback information on the preset dedicated resource for the second feedback information.

Further, the preset dedicated resource for the first feedback information and the preset dedicated resource for the second feedback information may have a one-to-one mapping relationship, and the one-to-one mapping relationship is configured or pre-configured by a higher layer. The first information sending sub-module 831 may include: a first determining unit 8311, adapted to, according to a time-frequency domain position of the monitored HARQ-ACK feedback informations of the other UEs in the group and according to the one-to-one mapping relationship between the preset dedicated resource for the first feedback information and the preset dedicated resource for the second feedback information, determine a time-frequency domain position of the preset dedicated resource for the second feedback information; and a first sending unit 8312, adapted to send the HARQ-NACK feedback information at the time-frequency domain position of the preset dedicated resource for the second feedback information.

In another embodiment, the HARQ feedback information may include a HARQ-ACK feedback information and a HARQ-NACK feedback information. The HARQ-ACK feedback information may be sent through a preset dedicated resource for a first feedback information, and the HARQ-NACK feedback information may be sent through a preset dedicated resource for a second feedback information, where the preset dedicated resource for the first feedback information and the preset dedicated resource for the second feedback information may be the same in the time domain and different in the frequency domain.

Further, the determining module 82 may include: a determining sub-module 822, adapted to, when the HARQ-ACK feedback information of the other UEs in the group is monitored on the preset dedicated resource for the first feedback information, determine whether the HARQ-NACK feedback information of the other UEs in the group is monitored on the preset dedicated resource for the second feedback information; a third determining sub-module 823, adapted to, when a result indicates that when the HARQ-ACK feedback information of the other UEs in the group is monitored on the preset dedicated resource for the first feedback information, the HARQ-NACK feedback information of the other UEs in the group is not monitored on the preset dedicated resource for the second feedback information, to determine that a data request information needs to be sent.

Further, the information sending module 83 may include: a second information sending sub-module 832, adapted to send the data request information on a preset dedicated resource for a third feedback information.

Further, the preset dedicated resource for the third feedback information and the preset dedicated resource for the first feedback information and/or the preset dedicated resource for the second feedback information may have one-to-one mapping relationships which may be configured or pre-configured by a higher layer. The second information sending sub-module 832 may include: a second determining unit 8321, adapted to, according to a time-frequency domain position of the HARQ-ACK feedback information of the other UEs in the group and the one-to-one mapping relationship between the preset dedicated resource for the first feedback information and the preset dedicated resource for the third feedback information, and/or according to a time-frequency domain position of the HARQ-NACK feedback information of the other UEs in the group and the one-to-one mapping relationship between the preset dedicated resource for the second feedback information and the preset dedicated resource for the third feedback information, determine a time-frequency domain position of the preset dedicated resource for the third feedback information; and a second sending unit 8322, adapted to send the data request information at the time-frequency domain position of the preset dedicated resource for the third feedback information.

Further, the preset dedicated resource for the third feedback information may be shared by multiple UEs in the group.

In another embodiment, the information sending module 83 may include: an acquiring sub-module 833, adapted to acquire a preset resource through resource awareness; and a third information sending sub-module 834, adapted to send the data request information on the preset resource acquired by the acquiring sub-module 833.

Further, the data request information may include: an ID of the UE sending the data request information; and a time difference between the preset resource and the resource of the monitored HARQ-ACK feedback information of other UEs in the group.

Further, the preset resource may be dedicated to the UE.

In some embodiments, the time-frequency domain position of the preset dedicated resource for the first feedback information may be indicated through a SCI, or may be determined by a combination of a high level signaling configuration and a SCI, or may be determined by a combination of pre-configuration and a SCI, or may be determined according to an association relationship with a receiving time-frequency domain position for a SCI or a sidelink data, where the association relationship may be configured or pre-configured by a high-level signaling.

Principles, detailed implementation and advantages of the HARQ feedback device 8 can be found in the above descriptions of the method as shown in FIG. 1 to FIG. 7, and are not described here.

In an embodiment of the present disclosure, a storage medium having computer instructions stored therein is provided, wherein once the computer instructions are executed, the above HARQ feedback method as shown in FIG. 1 to FIG. 7 is performed. Optionally, the storage medium may include a non-volatile or non-transitory memory or the like. The storage medium may include a Read Only Memory (ROM), a Random Access Memory (RAM), a magnetic disk, an optical disk or the like.

In an embodiment of the present disclosure, a terminal including a memory and a processor is provided, wherein the memory has computer instructions stored therein, and when the processor executes the computer instructions, the above method as shown in FIG. 1 to FIG. 7 is performed. The terminal may be a User Equipment (UE). For example, in a NR V2X multicast data transmission scenario, the terminal is a UE which works as a receiving end.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A Hybrid Automatic Repeat reQuest (HARQ) feedback method for multicast communication, comprising:
   in response to a failure to decode a sidelink control information (SCI), monitoring HARQ feedback informations of other UEs in a group;
   determining, according to the HARQ feedback informations of the other UEs in the group, whether either of a HARQ-Negative ACKnowledgment (HARQ-NACK) feedback information and a data request information needs to be sent; and in response to the HARQ-NACK feedback information or the data request information needing to be sent, sending the HARQ-NACK feedback information or the data request information on a preset resource.

2. The HARQ feedback method according to claim 1, wherein monitoring HARQ feedback informations of other UEs in a group comprises:
  monitoring at candidate positions of a sidelink multicast communication feedback channel; and
  in response to a monitored HARQ feedback information being scrambled with a preset group ID, determining that the monitored HARQ feedback information is a HARQ feedback information of the other UEs in the group.

3. The HARQ feedback method according to claim 2, wherein the candidate positions of the sidelink multicast communication feedback channel comprises: candidate positions of the sidelink multicast communication feedback channel of HARQ feedback informations corresponding to all moments in response to no data or feedback information being sent.

4. The HARQ feedback method according to claim 1, wherein the HARQ feedback informations comprise a HARQ-ACK feedback information and a HARQ-NACK feedback information, wherein the HARQ-ACK feedback information is sent through a preset dedicated resource for a first feedback information, the HARQ-NACK feedback information is sent through a preset dedicated resource for a second feedback information, and the preset dedicated resource for the first feedback information and the preset dedicated resource for the second feedback information have a time offset in the time domain.

5. The HARQ feedback method according to claim 4, wherein determining, according to the HARQ feedback informations of the other UEs in the group, whether or not a HARQ-NACK feedback information or a data request information needs to be sent comprises:
  in response to the other UEs in the group being monitored to send the HARQ-ACK feedback information, determining that the HARQ-NACK feedback information needs to be sent.

6. The HARQ feedback method according to claim 5, wherein sending the HARQ-NACK feedback information or the data request information on a preset resource comprises:
  sending the HARQ-NACK feedback information on the preset dedicated resource for the second feedback information.

7. The HARQ feedback method according to claim 6, wherein the preset dedicated resource for the first feedback information and the preset dedicated resource for the second feedback information have a one-to-one mapping relationship which is configured or pre-configured by a higher layer, and sending the HARQ-NACK feedback information on the preset dedicated resource for the second feedback information comprises:
  according to a time-frequency domain position of the monitored HARQ-ACK feedback information of the other UEs in the group and according to the one-to-one mapping relationship between the preset dedicated resource for the first feedback information and the preset dedicated resource for the second feedback information, determine a time-frequency domain position of the preset dedicated resource for the second feedback information; and
  sending the HARQ-NACK feedback information at the time-frequency domain position of the preset dedicated resource for the second feedback information.

8. The HARQ feedback method according to claim 7, wherein the time-frequency domain position of the preset dedicated resource for the first feedback information is indicated through a SCI, or determined by a combination of a high level signaling configuration and a SCI, or determined by a combination of pre-configuration and a SCI, or determined according to an association relationship with a receiving time-frequency domain position for a SCI or a sidelink data, where the association relationship is configured or pre-configured by a high-level signaling.

9. The HARQ feedback method according to claim 1, wherein the HARQ feedback informations comprise a HARQ-ACK feedback information and a HARQ-NACK feedback information, wherein the HARQ-ACK feedback information is sent through a preset dedicated resource for a first feedback information, the HARQ-NACK feedback information is sent through a preset dedicated resource for a second feedback information, and the preset dedicated resource for the first feedback information and the preset dedicated resource for the second feedback information are the same in a time domain and different in a frequency domain.

10. The HARQ feedback method according to claim 9, wherein determining, according to the HARQ feedback informations of the other UEs in the group, whether or not a HARQ-NACK feedback information or a data request information needs to be sent comprises:
  in response to the HARQ-ACK feedback information of the other UEs in the group being monitored on the preset dedicated resource for the first feedback information, determining whether the HARQ-NACK feedback information of the other UEs in the group is monitored on the preset dedicated resource for the second feedback information; and
  in response to the HARQ-ACK feedback information of the other UEs in the group being monitored on the preset dedicated resource for the first feedback information and the HARQ-NACK feedback information of the other UEs in the group being not monitored on the preset dedicated resource for the second feedback information, determining that the data request information needs to be sent.

11. The HARQ feedback method according to claim 10, wherein sending the HARQ-NACK feedback information or the data request information on a preset resource comprises:
  sending the data request information on a preset dedicated resource for a third feedback information.

12. The HARQ feedback method according to claim 11, wherein the preset dedicated resource for the third feedback information and the preset dedicated resource for the first feedback information and/or the preset dedicated resource for the second feedback information have one-to-one mapping relationships which are configured or pre-configured by a higher layer, and sending the data request information on a preset dedicated resource for a third feedback information comprises:
  according to a time-frequency domain position of the HARQ-ACK feedback information of the other UEs in the group and the one-to-one mapping relationship between the preset dedicated resource for the first feedback information and the preset dedicated resource for the third feedback information, and/or according to a time-frequency domain position of the HARQ-NACK feedback information of the other UEs in the group and according to the one-to-one mapping relationship between the preset dedicated resource for the second feedback information and the preset dedicated resource for the third feedback information, determining a time-frequency domain position of the preset dedicated resource for the third feedback information; and sending the data request information at the time-frequency domain position of the preset dedicated resource for the third feedback information.

13. The HARQ feedback method according to claim 12, wherein the time-frequency domain position of the preset dedicated resource for the first feedback information is indicated through a SCI, or determined by a combination of a high level signaling configuration and a SCI, or determined by a combination of pre-configuration and a SCI, or determined according to an association relationship with a receiving time-frequency domain position for a SCI or a sidelink data, where the association relationship is configured or pre-configured by a high-level signaling.

14. The HARQ feedback method according to claim 11, wherein the preset dedicated resource for the third feedback information is shared by multiple UEs in the group.

15. The HARQ feedback method according to claim 10, wherein sending the HARQ-NACK feedback information or the data request information on a preset resource comprises:

acquiring the preset resource through resource awareness; and sending the data request information on the preset resource which is acquired.

16. The HARQ feedback method according to claim 15, wherein the data request information comprises: an ID of a UE sending the data request information; and a time difference between the preset resource and a resource of the monitored HARQ-ACK feedback information of the other UEs in the group.

17. The HARQ feedback method according to claim 15, wherein the preset resource is dedicated to the UE.

18. A non-transitory storage medium having computer instructions stored therein, wherein once the computer instructions are executed, the method according to claim 1 is performed.

19. A Hybrid Automatic Repeat reQuest (HARQ) feedback device for multicast communication, comprising:

a monitoring circuitry, adapted to, in response to a failure to decode a sidelink control information (SCI), monitor HARQ feedback informations of other UEs in a group;

a determining circuitry, adapted to determine, according to the HARQ feedback informations of the other UEs in the group, whether either of a HARQ-Negative ACKnowledgment (HARQ-NACK) feedback information and a data request information needs to be sent; and an information sending circuitry, adapted to, in response to determining that the HARQ-NACK feedback information or the data request information needs to be sent, send the HARQ-NACK feedback information or the data request information on a preset resource.

20. A terminal comprising a memory and a processor, wherein the memory stores one or more programs, the one or more programs comprising computer instructions, which, when executed by the processor, cause the processor to:

in response to a failure to decode a sidelink control information (SCI), monitor Hybrid Automatic Repeat reQuest (HARQ) feedback informations of other UEs in a group;

determine, according to the HARQ feedback informations of the other UEs in the group, whether either of a HARQ-Negative ACKnowledgment (HARQ-NACK) feedback information and a data request information needs to be sent; and in response to the HARQ-NACK feedback information or the data request information needing to be sent, send the HARQ-NACK feedback information or the data request information on a preset resource.

* * * * *